United States Patent [19]

Hambright

[11] Patent Number: 5,234,340
[45] Date of Patent: Aug. 10, 1993

[54] HANDICRAFT GUIDE

[76] Inventor: Perry N. Hambright, 23515 Oxnard St., Woodland Hills, Calif. 91367

[21] Appl. No.: 844,248

[22] Filed: Mar. 2, 1992

Related U.S. Application Data

[63] Continuation-in-part of Ser. No. 564,740, Aug. 6, 1990, Pat. No. 5,096,422.

[51] Int. Cl.$^5$ .............................................. G09B 19/20
[52] U.S. Cl. ......................................... 434/95; 434/96; 434/81
[58] Field of Search .................. 434/81, 84, 85, 87, 434/88, 90, 95, 96, 97; 206/574, 575

[56] References Cited

U.S. PATENT DOCUMENTS

| | | |
|---|---|---|
| 532,110 | 1/1895 | Stockmann . |
| 819,877 | 5/1906 | Gilman . |
| 2,588,321 | 5/1950 | Hahn . |
| 2,864,178 | 12/1958 | Marquez ................................ 434/95 |
| 2,954,615 | 10/1960 | Brown .................................... 434/84 |
| 4,310,313 | 1/1982 | Brundige . |
| 4,530,665 | 7/1985 | Colonel . |
| 4,634,616 | 1/1987 | Musante et al. . |
| 4,912,850 | 4/1990 | Gray .................................. 434/96 X |
| 5,096,422 | 3/1992 | Hambright . |
| 5,141,438 | 8/1992 | Spector ............................. 434/84 X |

Primary Examiner—Richard J. Apley
Assistant Examiner—Karen A. Jalberit
Attorney, Agent, or Firm—Kelly, Bauersfeld & Lowry

[57] ABSTRACT

A handicraft guide is provided for locating in a specific array a plurality of members such as sequins, on a surface such as a layer of fabric. A thin sheet material has inscribed thereon a pattern which is to be reproduced as a design on the mounting surface. The pattern is made up of rows of symbols which indicate proper placement of the members onto the mounting surface. Separating lines run between adjacent rows, permitting each row of symbols to be peeled away from the mounting base to expose the edge of a next adjacent row of symbols. Each symbol corresponds to a specific member that is to be fixedly mounted onto the mounting base directly adjacent the symbol. In utilizing the handicraft guide, a member is fixed to the mounting base adjacent to each symbol provided on the first row of the guide. That first row is peeled away and the process is repeated for the second row and so forth until the desired design has been reproduced. The guide is then removed from the mounting base.

18 Claims, 1 Drawing Sheet

HANDICRAFT GUIDE

RELATED APPLICATION

This is a continuation in part of U.S. patent application Ser. No. 07/564,740, filed Aug. 6, 1990, U.S. Pat. No. 5,096,42 and entitled HANDICRAFT GUIDE.

BACKGROUND OF THE INVENTION

This invention relates generally to handicrafts. More particularly, the present invention relates to a handicraft utilized to reproduce a design onto a mounting base such as a layer of fabric of a shirt.

The utilizing of handicrafts in conjunction with fabrics has long been known. Besides quilting, there is needlepoint, cross-stitching and other handicrafts that are based on incorporating yarn of different colors in the form of stitches on fabric. These stitches are to be arranged on the fabric in a specific arrangement forming a desired "picture"

Another way in which a desired "picture" could be achieved on fabric is by utilizing sequins in the form of small flat circular disks which are made in a wide variety of colors. Sequins can be placed on the fabric to form a particular design. The different colors can be utilized to denote certain features within that design. For example, a common design would be a domestic animal such a dog, cat or bird.

The placing of a handicraft on fabric in a desired location generally has been accomplished by two methods. The first method is to have the design reproduced as a chart on graph paper with symbols being utilized to represent different colors. The crafter can duplicate that design onto the fabric by counting from the chart and reproducing the design by utilization of the same count on the fabric.

The second method, sometimes referred to as the "no count" method, simply has the original design painted or printed directly onto the fabric. All the crafter has to do is cover the printed color (or color designated area) with the appropriate matching color of craft material. This method is far faster and easier than counting, but it cannot be used in many instances. If, for example, the fabric is black, the printing or painting might be very difficult to observe. Another reason for not utilizing the "no count" method is that only preprinted fabric may be used, which excludes the majority of fabric choices.

Accordingly, there is a need for a handicraft which assists crafters in reproducing designs on mounting surfaces that do not already have the pattern provided thereon. Additionally, such a handicraft is needed which does not require use of a fabric with a gridded construction in order to reproduce designs correctly, such as needlepoint canvas, and which can be utilized with sequins, mosaic tile pictures, or anything which requires reproduction of a design by bits of color in a grid array. Moreover, a novel handicraft is needed which can be used in connection with any color of fabric or underlying surface which, utilizing traditional methods, would not easily facilitate the preprinting of patterns thereon. The present invention fulfills these needs and provides other related advantages.

SUMMARY OF THE INVENTION

The present invention resides in an improved handicraft guide and a related method which is easy to use and permits a crafter to easily place members onto a mounting surface in a pattern provided by the guide.

The pattern imprinted on the guide is made up of specific areas to indicate placement of members, each with specific indicia to indicate color. The pattern is right-reading and imprinted on a sheet base. The base is placed face up on the mounting surface and rows of indicia are stripped away one row at a time to permit the members (colored craft material) to be placed on the mounting surface directly adjacent to the rows of areas bearing color indicia.

In a preferred form of the invention a handicraft guide is provided for locating in a specific array a plurality of members on a mounting surface, wherein the members are divided into groups and each member of each respective group is identical. Each member of each group includes individual identifying first indicia with the first indicia of each group being different. A thin sheet material base is provided which has an upper surface and a lower surface. Tear-away or separating lines are included within the base for dividing the base into a series of rows.

The upper surface of the base has inscribed thereon a series of identifying areas which are arranged in rows. Each area corresponds to a respective member, and each area includes second indicia corresponding to one of the groups. The areas are arranged in a specific manner forming a right-reading image of the resulting design of the handicraft that is to be reproduced on the mounting surface. The first indicia comprises a plurality of colors. Each area is polygonal in shape, and each member is circular in configuration.

The lower surface of the base includes an adhesive material capable of adhering the base to the mounting surface. A peel-away liner underlies the lower surface of the base to protect the adhesive material. The peel-away liner is removed to expose the adhesive material prior to mounting the base to the mounting surface. A carrying strip is also provided along one edge of the base, extending generally perpendicular to the rows.

In use, the lower surface of the base is placed directly against the mounting surface. All rows beneath the first can be exposed to provide an alignment edge for members by peeling-away the first row of the base along one of the tear-away lines. The members are placed on the mounting surface directly adjacent to each area according to the second indicia which corresponds with the first indicia. The tear-away lines are parallel, with the distance between directly adjacent tear-away lines being equal. The tear-away lines are preferably die cut, with skips provided therein to prevent separation of adjacent rows prior to mounting the base to the mounting surface.

The foregoing apparatus may be utilized in a preferred method of producing a handicraft constructed of a plurality of colored members being fixed onto a mounting surface in a specific pattern. First, the guide is placed on the mounting surface. The guide has inscribed thereon a plurality of areas arranged in rows with each area bearing indicia corresponding to a particular color of the members. The areas are arranged in a right-reading arrangement of the pattern that is to be produced on the mounting surface.

For a first row of inscribed areas, one of the members is placed and fixed onto the mounting surface directly adjacent to its corresponding area. This placing and fixing procedure is repeated for the entire first row. When the members of the first row have been so placed, the first row of the handicraft guide is peeled away from the mounting surface to expose an edge of a second row of areas.

For the second row of inscribed areas, one of the members is placed and fixed onto the mounting surface directly adjacent to its corresponding area. This placing and fixing procedure is repeated for the entire second row. As each row is completed, the steps of peeling away a row of the guide, and then placing and fixing members onto the mounting surface directly adjacent to corresponding areas is repeated until there has been mounted on the mounting surface a member for each area.

The guide is temporarily fixed to the mounting surface when initially placed thereon. In one embodiment, the method includes the steps of preventing the complete separation of the adjacent rows during the peeling away step, and reassembling the guide after all of the members have been mounted to the mounting surface.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
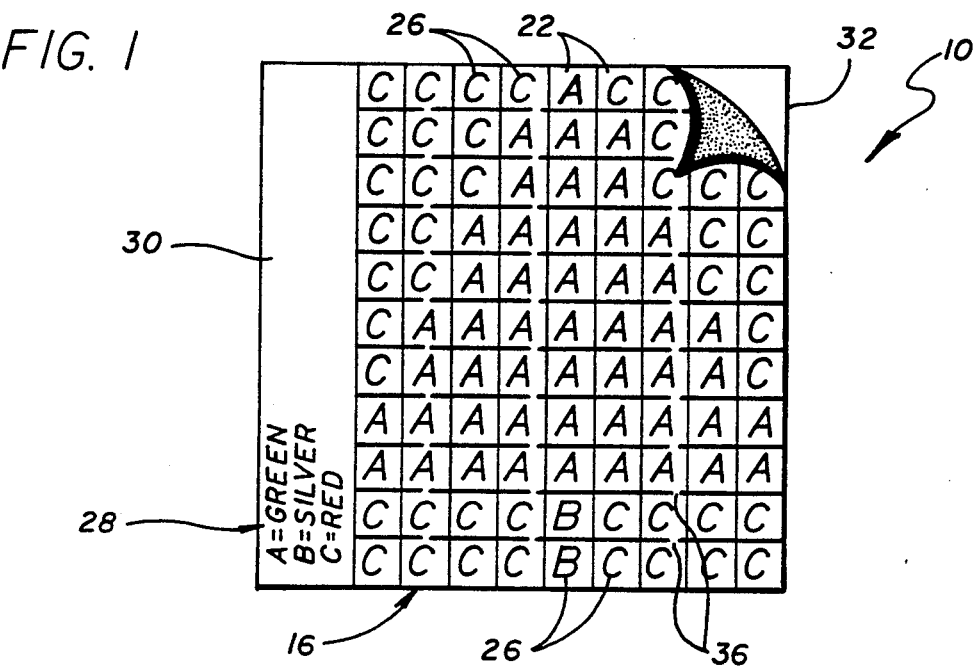
FIG. 1 is a top plan view of a handicraft guide embodying the present invention, wherein the upper right hand corner of the handicraft guide is illustrated as peeled forwardly away from a non-stick liner sheet provided to protect a lower adhesive surface of the handicraft guide.

As shown in the drawings for purposes of illustration, the present invention is concerned with a handicraft guide, generally designated in the accompanying drawings by the reference number 10. The handicraft guide 10 is useful for locating in a specific array a plurality of members 12 on a mounting surface 14. The members 12 are individual bits of various types of craft material, which may include sequins, printed paper, twisted papers, foam rubber, yarn, rhinestones, plastic chips, or any other suitable craft material. They are mounted onto the surface 14 (which may be a fabric material), utilizing adhesives, thread, staples, magnets or any other suitable attachment method.

Figure 2:
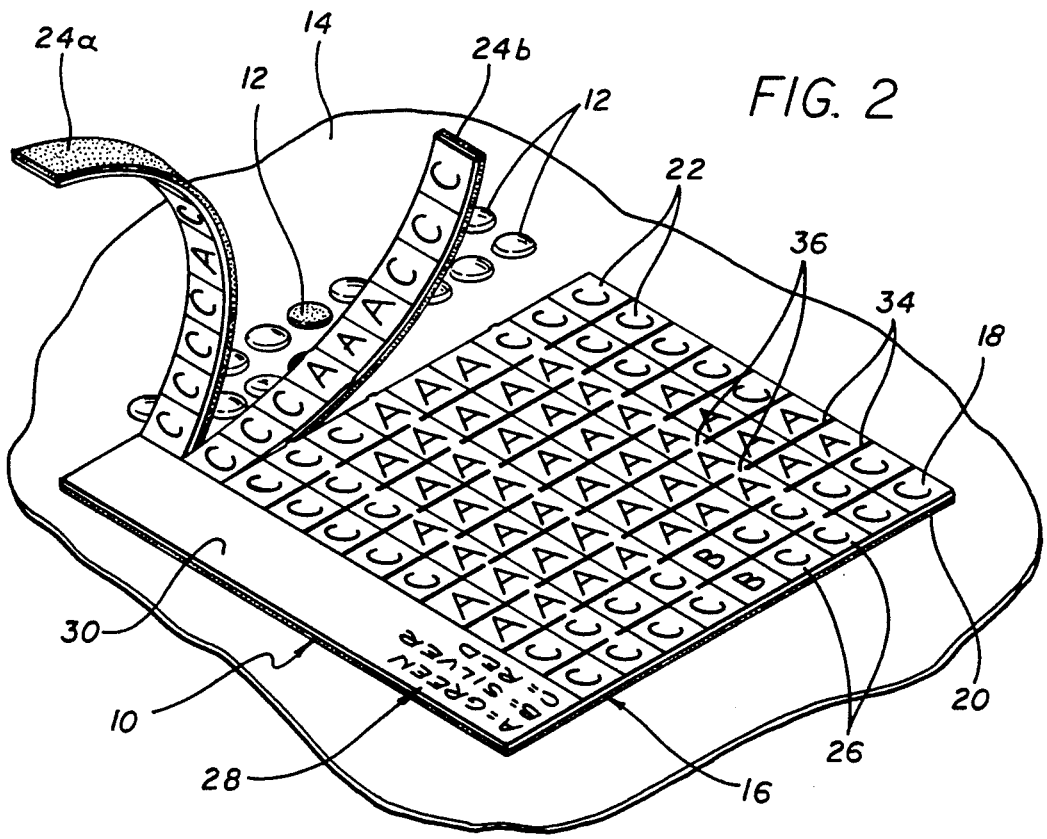
FIG. 2 is a top, front and right side perspective view of the handicraft guide shown in FIG. 1, illustrating the manner in which the handicraft guide is utilized on a section of fabric in order to reproduce a design on the fabric.

Preferably the members are divided into groups, wherein each member of each respective group is identical. For example, the members may be sequins, wherein the sequins are divided into groups by color. Each member of each group includes individual identifying first indicia, with the first indicia of each group being different The first indicia of the sequin members 12 shown in FIG. 2 is the color of the sequins.

In accordance with the present invention, the handicraft guide 10 comprises a thin sheet material base 16 having an upper surface 18 and a lower surface 20. The upper surface has inscribed thereon a series of identifying areas 22 arranged in rows 24. Each area 22 is identical in size and is shown to be square in shape. However, the square shape can be varied without departing from the scope of the present invention. Imprinted within each area 22 is an indicia 26 that corresponds to a color key 28 printed onto a carrying strip 30. The indicia 26 shown in the drawings comprise the letters A, B and C which correspond, for example, to the colors green, silver and red, but could be instead of letters—numerals, symbols, colored-in area or any other form of indicia. The indicia 26 are arranged in a specific manner forming a right-reading image of the resulting design of the handicraft that is to be reproduced on the mounting surface 14.

The lower surface 20 of the base 16 includes an adhesive material capable -f temporarily adhering the base to the mounting surface. As shown in FIG. 1, a peel-away liner 32 underlies the lower surface 20 of the base 16 to prevent the adhesive from being exposed prior to mounting the base 16 to the mounting surface 14.

Tear-away lines 34 are included within the base 16 for dividing the rows 24. The tear-away lines 34 are preferably die-cut and are provided with skips 36 which prevent separation of adjacent rows when the peel-away liner 32 is removed from the lower surface 20 prior to mounting the base 16 to the mounting surface 14. The tear-away lines 34 are parallel with the distance between directly adjacent tear-away lines being equal, but non-parallel or varied widths of rows would not deviate from the invention.

In use, the peel-away liner 32 is first removed from the lower surface 20 of the base 16, and the lower surface is placed directly over the mounting surface 14. The handicraft guide 10 should be placed directly over the portion of the mounting surface 14 onto which the members 12 are to be applied, recognizing that the first row of members 12 will be placed adjacent an upper edge of the first row 24a. When so positioned, the members 12 are placed into the mounting surface 14 directly adjacent to corresponding areas 22 of the first row 24a. As shown, a green sequin will be placed adjacent to the area bearing the "A" indicia, and red sequins will be placed adjacent to the remaining areas bearing the "C" indicia.

When this has been accomplished, the first row 24a of the handicraft guide 10 is peeled away from the mounting surface 14 to expose the second row 24b of areas 22. A similar procedure is then followed as with the first row 24a, in that the members 12 are placed and fixed onto the mounting surface 14 directly adjacent to their corresponding areas. Specifically, three green sequins will be placed directly above the areas bearing the "A" indicia and red sequins will be placed directly above the areas bearing the "C" indicia. When the entire second row of sequins are in place, a second row 24b is peeled away and this procedure is repeated until there has been mounted on the mounting surface 14 a member 12 for each area 22 with indicia 26 inscribed thereon.

The carrying strip 30 which forms a portion of the base 16 is not die cut to prevent the complete separation of the adjacent rows 24 during the peeling away step. This permits the guide to be reassembled onto the peel-away liner 32 for later use after all of the members have been mounted to the mounting surface.

From the foregoing it is to be appreciated that the novel handicraft guide 10 of the present invention provides a convenient right-reading pattern for the placement of various craft materials onto an underlying mounting surface. Use of the handicraft guide 10 does not require that the pattern to be preprinted onto the mounting surface. The handicraft guide 10 is easy to use, inexpensive to manufacture, and can be configured to provide a wide variety of patterns.

Although a particular embodiment of the invention has been described in detail for purposes of illustration, various modifications may be made without departing from the spirit and scope of the invention. Accordingly, the invention is not to be limited, except as by the appended claims.

I claim:

1. A handicraft guide for locating in a specific array a plurality of members on a mounting surface, wherein the members are divided into groups and each member of each respective group is identical, and wherein each member of each group includes individual identifying first indicia with the first indicia of each group being different, said handicraft guide comprising:

a thin sheet material base having an upper surface and a lower surface, the upper surface having inscribed thereon a series of identifying areas arranged in rows, wherein certain areas correspond to certain respective members, wherein such areas include second indicia corresponding to one of the groups, and the lower surface having an adhesive material capable of adhering the base to the mounting surface;

separating lines included within the base for dividing the rows, whereby the lower surface is to be placed directly against the mounting surface and by peeling away a portion of the base along one of the separating lines there will be exposed the edge of one of the rows, and whereby a member is to be placed on the mounting surface directly beside the exposed edge and adjacent to certain areas of the row according to the second indicia which is to correspond with the first indicia; and a carrying strip along one edge of the base and extending generally perpendicular to the rows.

2. A handicraft guide as set forth in claim 1, wherein the second indicia is arranged in a specific manner forming a right-reading image of the resulting design of the handicraft that is to be reproduced on the mounting surface.

3. A handicraft guide as set forth in claim 2, wherein the first indicia comprises a plurality of colors.

4. A handicraft guide as set forth in claim 3, wherein each area is polygonal in shape, and each member is circular in configuration.

5. A handicraft guide as set forth in claim 1, including a peel-away liner generally underlying the lower surface of the base, wherein the peel-away liner is removed to expose the adhesive material prior to mounting the base to the mounting surface.

6. A handicraft guide as set forth in claim 1, wherein the separating lines are die-cut.

7. A handicraft guide as set forth in claim 6, wherein the separating lines are generally parallel with the distance between directly adjacent separating lines being generally equal.

8. A handicraft guide as set forth in claim 7, wherein skips are provided in the separating lines to prevent separation of adjacent rows prior to mounting the base to the mounting surface.

9. A handicraft guide for locating in a specific array a plurality of members on a mounting surface, wherein the members are divided into groups and each member of each respective group is identical, and wherein each member of each group includes individual identifying first indicia with the first indicia of each group being different, said handicraft guide comprising:

a thin sheet material base having an upper surface and a lower surface, the upper surface having inscribed thereon a series of identifying areas arranged in rows, wherein certain areas correspond to certain respective members, wherein such areas include second indicia corresponding to one of the groups, and the lower surface includes an adhesive material;

a peel-away liner underlying the lower surface of the base; and separating lines included within the base for dividing the rows, wherein the separating lines are die-cut with skips provided to prevent separation of the rows prior to fixing the base to the mounting surface, whereby when the adhesive material is exposed by removing the peel-away liner the lower surface is to be placed directly against the mounting surface, and by peeling away a portion of the base along one of the separating lines there will be exposed the edge of one of the rows, and whereby a member is to be placed on the mounting surface directly beside the exposed edge and adjacent to certain areas of the row according to the second indicia which is to correspond with the first indicia, wherein the separating lines are generally parallel with the distance between directly adjacent separating lines being generally equal.

10. A handicraft guide as set forth in claim 9, including a carrying strip along one edge of the base extending generally perpendicular to the rows.

11. A method or producing a handicraft constructed of a plurality of colored members being fixed onto a mounting surface in a specific pattern, the steps comprising:

placing a guide on the mounting surface, the guide having inscribed thereon a plurality of areas arranged in rows with certain areas bearing indicia corresponding to a particular color of the members, wherein the areas are arranged in a right-reading arrangement of the pattern that is to be produced on the mounting surface;

for a first row of inscribed areas, placing and fixing one of the members onto the mounting surface directly adjacent to its corresponding area and repeating this placing and fixing procedure for the entire first row;

peeling the first row of the guide away from the mounting surface to expose the edge of a second row of areas;

for the second row of inscribed areas, placing and fixing one of the members onto the mounting surface directly adjacent to its corresponding area and repeating this placing and fixing procedure for the entire second row; and proceeding with repeating the peeling away step and the placing and fixing steps until there has been mounted on the mounting surface a member for each area with indicia inscribed within.

12. A method as set forth in claim 11, including the step of temporarily fixing the guide onto the mounting surface.

13. A method as set forth in claim 11; including the steps of preventing the complete separation of the adjacent rows during the peeling away step and the placing and fixing steps, and reassembling the guide after all of the members have been mounted to the mounting surface.

14. A handicraft guide for locating in a specific array a plurality of members on a mounting surface, wherein the members are divided into groups and each member of each respective group is identical, and wherein each member of each group includes individual identifying first indicia with the first indicia of each group being different, said handicraft guide comprising:

a thin sheet material base having an upper surface and a lower surface, the upper surface having inscribed thereon a series of identifying areas arranged in rows, wherein certain areas correspond to certain respective members, wherein such areas include second indicia corresponding to one of the groups, and the lower surface having an adhesive material; and separating lines included within the base for dividing the rows, wherein the separating lines are die-cut with skips provided to prevent separation of the rows prior to fixing the base to the mounting surface, whereby the lower surface is to be placed directly against the mounting surface and by peeling away a portion of the base along one of the separating lines there will be exposed the edge of one of the rows, and whereby a member is to be placed on the mounting surface directly beside the exposed edge and adjacent to certain areas of the row according to the second indicia which is to correspond with the first indicia.

15. A handicraft guide as set forth in claim 14, wherein the second indicia is arranged in a specific manner forming a right-reading image of the resulting design of the handicraft that is to be reproduced on the mounting surface, and wherein the first indicia comprises a plurality of colors.

16. A handicraft guide as set forth in claim 14, including a peel-away liner generally underlying the lower surface of the base, wherein the peel-away liner is removed to expose the adhesive material prior to mounting the base to the mounting surface.

17. A handicraft guide as set forth in claim 14, including a carrying strip along one edge of the base and extending generally perpendicular to the rows.

18. A handicraft guide as set forth in claim 14, wherein the separating lines are generally parallel with the distance between directly adjacent separating lines being generally equal.

* * * * *